United States Patent [19]

Souma

[11] 4,181,200
[45] Jan. 1, 1980

[54] ANTI-RATTLE AND POSITIONING MEMBER FOR A DISC BRAKE PAD

[75] Inventor: Teruo Souma, Toyota, Japan

[73] Assignee: Toyota Jidosha Kogyo Kabushiki Kaisha, Aichi, Japan

[21] Appl. No.: 917,801

[22] Filed: Jun. 22, 1978

[30] Foreign Application Priority Data

Jan. 31, 1978 [JP] Japan ............................ 53-10329[U]

[51] Int. Cl.² ............................................ F16D 65/02
[52] U.S. Cl. .................................. 188/73.5; 188/73.6
[58] Field of Search .................. 188/73.5, 73.6, 205 A, 188/73.1

[56] References Cited

U.S. PATENT DOCUMENTS

| | | | |
|---|---|---|---|
| 3,625,314 | 12/1971 | Rinker | 188/73.5 |
| 3,841,445 | 10/1974 | Rinker | 188/73.5 |
| 3,933,227 | 1/1976 | Gennes | 188/73.5 |
| 3,942,612 | 3/1976 | Marchand | 188/73.6 |
| 4,082,167 | 4/1978 | Einchcombe et al. | 188/73.6 |

FOREIGN PATENT DOCUMENTS

| | | | |
|---|---|---|---|
| 914686 | 1/1963 | United Kingdom | 188/73.6 |
| 1366446 | 9/1974 | United Kingdom | 188/73.5 |

*Primary Examiner*—Edward R. Kazenske
*Attorney, Agent, or Firm*—Stevens, Davis, Miller & Mosher

[57] ABSTRACT

A disc brake for a vehicle, wherein an anti-rattling member, placed between a brake pad and a stationary or fixed member for retaining the same with the object of preventing rattling of the brake pad, is provided with a positioning portion integrally formed. The positioning portion of the anti-rattling member for facilitating mounting of the brake pad is disposed in such a position that when the brake pad is mounted (or inserted) into the stationary member from a direction parallel to the friction surface thereof the positioning portion contacts the lateral side of the brake pad for being able to position the brake pad in the circumferential direction of the disc motor. Shifting of the brake pad from this status in the perpendicular direction to the friction surface thereof will make the brake pad exactly engage with the torque receiving arm of the stationary member.

10 Claims, 3 Drawing Figures

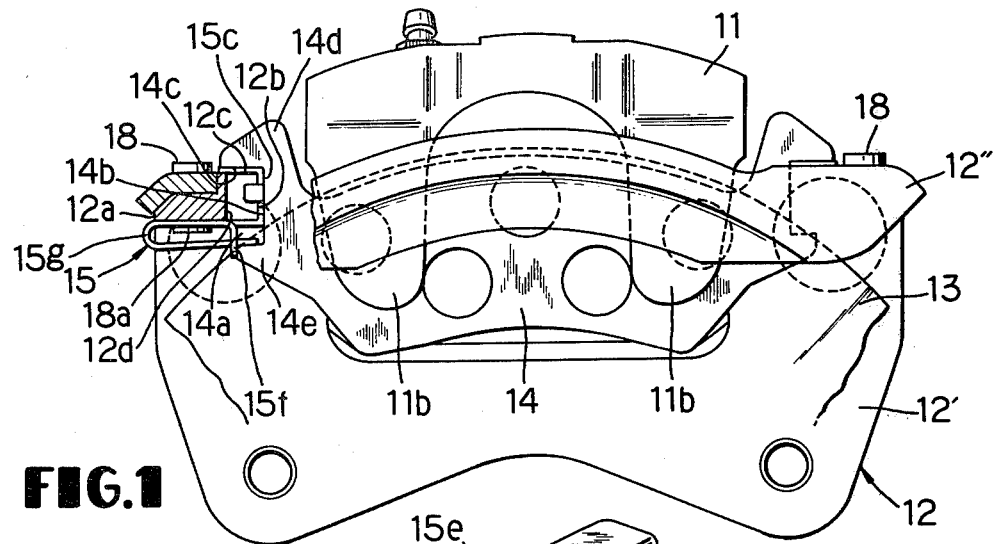
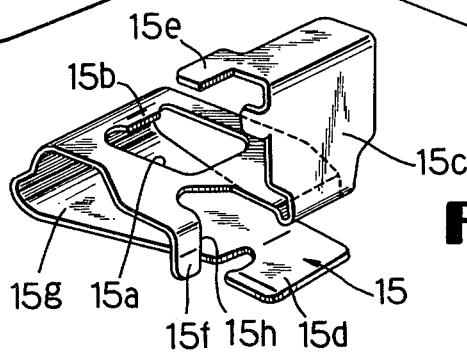
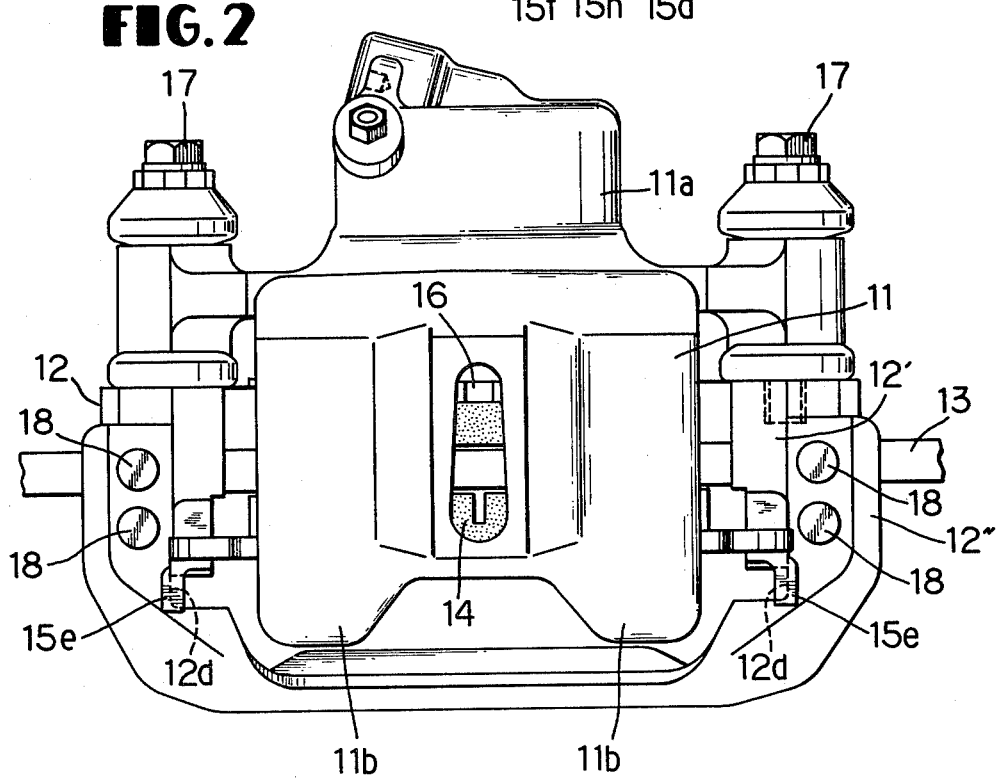

ANTI-RATTLE AND POSITIONING MEMBER FOR A DISC BRAKE PAD

BACKGROUND OF THE INVENTION

The present invention relates to a disc brake for a vehicle, more particularly, to an improvement of the brake structure for facilitating the mounting of a brake pad to a disc brake. Disc brakes, wherein a brake pad (hereinafter called simply pad) movably retained by a stationary or fixed member is urged onto a rotating disc rotor to restrict the rotation thereof, are widely utilized in vehicles. It is also a general practice that an anti-rattling spring be inserted between the pad and the stationary member for preventing the rattling of the pad by means of constantly biasing the same in a parallel direction to the friction surface thereof, because of the likelihood of rattling of the pad while the vehicle is running.

I once, with the cooperation of a co-inventor, made an invention for a disc brake, which was for facilitating the mounting of a pad thereto. According to the invention the pad was provided with a recess (a notch), on either lateral side thereof, for being engaged with a pad retaining portion of the stationary (fixed) member, and two of the lateral protrusions, upper and lower, having the recess inbetween, the upper protrusion being projected laterally more than the lower protrusion; the pad retaining portion of the stationary member is also provided with a recess (a notch) of such a size that allows the lower protrusion of the pad to pass through the recess on the pad retaining portion in a direction perpendicular to the pad retaining portion, but does not allow the upper protrusion therethrough. This invention is pending in the U.S. Patent Office with the Ser. No. 843,940.

I made another invention relating to the disc brake, which is pending in the U.S. Patent Office with the Ser. No. 933,747. In this patent application I referred to the above-mentioned technological idea disclosed in the U.S. patent application (Ser. No. 843,940). This invention relates also to a technique for facilitating the mounting of a pad to the stationary member, by contacting the upper protrusion of the pad (disclosed in the application Ser. No. 843,940) on an elongated portion of the anti-rattling member, for the purpose of properly positioning the pad (when being mounted) in the vertical direction, i.e., radial direction of the rotor.

In the above U.S. patent application Ser. No. 933,747 I disclosed another technology which is aimed at smooth sliding, and prevention of rusting, between the pad and the stationary member, by means of extending a part of the anti-rattling member for inserting and keeping the extended part between the pad and the stationary member.

SUMMARY OF THE INVENTION

This invention was made from such a background, with the object of improving the structure of the disc brake.

It is therefore a primary object of this invention to properly position a pad, making good use of an anti-rattling member, in the circumferential direction of the disc rotor, thereby facilitating the placing or putting work of the pad.

It is another object of this invention to provide a disc brake having an anti-rattling member capable of properly positioning a pad, not only in a circumferential but also in a radial direction of the disc rotor.

It is a further object of this invention to provide a disc brake, wherein a pad can be properly positioned in relation to a pad retaining member or a stationary member, and moreover, settling of the anti-rattling member itself in the stationary member may be largely facilitated.

It is a still further object of this invention to provide a disc brake wherein a pad can be readily placed or mounted and the pad can be agreeably or lightly shifted when brake applying, such light shifting of the pad being guaranteed for a long period of time.

Other objects and advantages will be apparent to those skilled in the art from the following description of a specific embodiment of the inventive principles that will thereafter be pointed out in the claims.

BRIEF DESCRIPTION OF THE DRAWINGS

FIG. 1 is a elevational view of an embodiment of a disc brake in accordance with this invention partly broken away;

FIG. 2 is an plan view of the same; and

FIG. 3 is a perspective view of an anti-rattling spring used in the same disc brake.

DETAILED DESCRIPTION OF THE PREFERRED EMBODIMENT

FIGS. 1-3 show a disc brake, incorporating an anti-rattling spring of this invention, and an anti-rattling spring (an anti-rattling member) itself in enlargement. Numeral 11 indicates a caliper, and 11a is a fluid-pressure cylinder. When a piston (not shown), which is accommodated in the cylinder 11a, urges a pad 16 directly to press a disc rotor 13, another pad 14, which is mounted in a confronted position with the fluid-pressure cylinder 11a between a lug portion 11b (depending portion) of the caliper 11 and the disc rotor 13, is at the same time urged onto the disc rotor 13 from the other side, in a mode of sandwiching the same 13. The caliper 11 and the pads 14, 16 are all attached to a non-rotating member of the vehicle by a mounting bracket 12, which is composed of two members, a first member 12' including a torque receiving arm 12a disposed, in the direction perpendicular to the surface of, and just off the peripheral surface of, the disc rotor 13, and a second member 12" secured to the torque receiving arm 12a with rivets 18. The pad 14 is mounted on the torque receiving arm 12a. The pad 14 is, on the opposite end portions in the longitudinal direction thereof, provided with a notch or recess 14a of rectangular configuration; the pad 14 can therefore be fitted, with this notch 14a, on the torque receiving arm 12a. Between the pad 14 and the torque receiving arm 12a is mounted an anti-rattling spring 15, and the pad 14 is constantly biased downwards by a U-shaped spring portion 15g, which acts on the lower surface of the torque receiving arm 12a and the notch 14a of the pad 14. The anti-rattling spring 15 is formed of a plate member into a shape shown in FIG. 3. An opening 15a, an engaging hole, of the anti-rattling spring 15 is to engage with the head 18a of the rivet 18 for fastening the second member 12" to the torque receiving arm 12a. A pawl 15b of the anti-rattling spring 15, or a projection, is formed for making the connection thereof with the rivet head 18a ensured.

The anti-rattling spring 15 is, for the purpose of avoiding direct contact between the pad 14 and the torque receiving arm 12a, bent at its extension portion 15c, along a torque receiving surface 12b and a sliding surface 12c of the mounting bracket 12, with the result of covering these two surfaces. This extension portion 15c is of highly effective in making the sliding of the pad 14 on the torque receiving arm 12a smooth and in preventing friction increase by rusting therebetween.

The anti-rattling spring 15 has, on the portion including the opening 15a and at the farthest position from the rotor 13, a tongue like projection 15f depending downwardly, in parallel to the torque receiving surface 12b, therefrom. It works as a guide, when the pad 14 is inserted, for positioning the same in the circumferential direction of the rotor 13, and again as a guide for the pad 14 when being moved perpendicularly to the rotor surface. In other words, the pad 14 is firstly inserted through a recess 12d formed in the mounting bracket 12, as shown in FIG. 1, and then a lower projection 14e, one of the two upper and lower projections 14d, 14e formed on the pad 14, is abutted on the tongue like projection 15f for fixing the position of the pad 14 between the two torque receiving surfaces 12b, and aligning the recess of the pad 14 with the torque receiving arm 12a of the mounting bracket 12. Depressing of the pad 14 at this status toward the rotor 13 will readily finish a smooth engagement of both, the pad 14 and the mounting bracket 12.

For performing the anti-rattling function, an anti-rattling portion 15d if formed, which is provided with a perpendicular surface to the surface of the tongue like projection 15f. As this anti-rattling portion 15d is extended close to the edge 15h on the disc rotor 13 side of the tongue like projection 15f the anti-rattling portion 15d is to be engaged, where the pad 14 is being exactly positioned by the tongue like projection 15f, with the lower projection 14e of the pad 14. It makes the movement of the pad 14 in the direction toward the rotor 13 smoother.

On the tip of the extension portion 15c is also formed another tongue like projection 15e, as shown in FIG. 3, for preventing the pad 14, when it is put in or mounted, from being out of place. As earlier stated, the pad 14 is provided with the upper and lower projections 14d, 14e, with the recess inbetween, the former 14d being projected laterally larger. The lower one 14e is to pass through the recess 12d in the mounting bracket 12, the upper one 14d however being restricted to pass therethrough. Attempts are thus made for facilitating the mounting of the pad 14. In reality, however, ofter occurring dimensional errors in formation of the recess 12d of the mounting bracket 12 resulting in the upper projection 14d of the pad 14 passing through the recess 12d of the mounting bracket 12, which inherently ought not to happen. For preventing such an undesirable misgiving, the projection 15e of the anti-rattling spring 15 has been designed so as to position the pad 14 in the radial direction of the disc rotor 13 by covering a part of the recess 12d in the mounting bracket 12 with the projection 15e.

As can be understood from this embodiment, the pad 14 can be easily and surely put in the mounting bracket 12, since the tongue like projection 15f permits ensured positioning in the longitudinal direction, while the anti-rattling portion 15d permits stable positioning in the vertical direction, and the projection 15e performs the function of preventing the pad 14 from being out of place in the initial stage of mounting.

It will be obvious to those skilled in the art that various changes may be made without departing from the scope of the invention and the invention is not to be considered limited to what is shown in the drawings and described in the specification.

What is claimed is:

1. In a disc brake for a vehicle including:
   a disc rotor rotatable around a disc axis;
   a fixed member with a first and a second torque receiving arms extending parallel to said disc axis;
   first and second brake pads each having a friction surface substantially normal to said disc axis and mounted on said fixed member in a confronted position to each other and having said disc rotor placed there between wherein at least said first brake pad is supported by said torque receiving arms;
   at least one anti-rattling member, disposed between said first brake pad and said first torque receiving arm, for preventing the rattling of said first brake pad by biasing said first brake pad with the elasticity of said anti-rattling member in a direction parallel to the friction surface of said first brake pad; and
   an urging mechanism, retained by said fixed member, for urging said first and second brake pads onto said disc rotor, said disc brake further comprising:
   (a) upper and lower projections laterally protruding, each of which has an end surface, from each lateral end of said first brake pad to form an engagement recess therebetween for engaging with said torque receiving arms, the end surface of said upper projection protruding laterally beyond the end surface of said lower projection;
   (b) first and second pad-inserting recesses formed respectively in a part of said first and second torque receiving arms for permitting said lower projections to pass therethrough in a direction normal to said torque receiving arms; and
   (c) a circumferential positioning portion integrally formed on said anti-rattling member so as to be positioned beneath said first pad-inserting recess and to contact the end surface of said lower projection which has passed said first pad-inserting recess for positioning said first brake pad in the circumferential direction of said disc rotor when said first brake pad is put between said first and second torque receiving arms from a direction normal thereto.

2. A disc brake for a vehicle in accordance with claim 1, wherein said anti-rattling member is made of a plate member and said positioning portion is formed by downwardly bending a part of said plate member.

3. A disc brake for a vehicle in accordance with claim 1, wherein an additional anti-rattling member is disposed between said first brake pad and said second torque receiving arm, each of said anti-rattling members being provided with an anti-rusting portion, which is interposed between said first brake pad and each of said torque receiving arms for preventing them from being rusted therebetween.

4. In a disc brake for a vehicle including:
   a disc rotor rotatable around a disc axis;
   a fixed member with first and second torque receiving arms extending parallel to said disc axis;
   first and second brake pads each having a friction surface substantially normal to said disc axis and mounted on said fixed member in confronted position with each other, wherein said disc rotor is placed therebetween, at least said first brake pad being supported by said torque receiving arms;

at least one anti-rattling member, disposed between said first brake pad and said first torque receiving arm, for preventing the rattling of said first brake pad by biasing said first brake pad with the elasticity of said anti-rattling member in a direction parallel to the friction surface of said first brake pad; and an urging mechanism, retained by said fixed member, for urging said first and second brake pads onto said disc rotor, said disc brake further comprising:

(a) upper and lower projections laterally protruding, each of which has an end surface, from each lateral end of said first brake pad to form an engaging recess therebetween for engagement with said torque receiving arms, the end surface of said upper projection protruding laterally beyond the end surface of said lower projection;

(b) first and second pad-inserting-recesses formed respectively in a part of said first and second torque receiving arms;

(c) a radial positioning portion integrally formed on said anti-rattling member so as to cover a part of said first pad-inserting-recess preventing said upper projection from passing therethrough in a direction normal to said first torque receiving arm while permitting said lower projection to pass therethrough, whereby said first brake pad is positioned in a radial direction of said disc rotor; and (d) a circumferential positioning portion integrally formed on said anti-rattling member so as to be positioned beneath said first pad-inserting-recess and to contact the end surface of said lower projection which has passed said first pad-inserting-recess for positioning said first brake pad in the circumferential direction of said disc rotor when said first brake pad is put between said first and second torque receiving arms from a direction normal thereto.

5. A disc brake for a vehicle in accordance with claim 4, wherein said anti-rattling member is made of a plate member and said circumferential positioning portion is formed by downwardly bending a part of said plate member.

6. A disc brake for a vehicle in accordance with claim 4, wherein a second anti-rattling member is disposed between said first brake pad and said second torque receiving arm, and each of said anti-rattling members are provided with an anti-rusting portion, which is interposed between said first brake pad and each of said torque receiving arms for preventing them from being rusted therebetween.

7. A disc brake for a vehicle in accordance with claim 4, wherein said anti-rattling member is provided with a U-shaped spring portion which is set between said first torque receiving arm and said lower projection adjacent thereto for the performing anti-rattling function.

8. A disc brake for a vehicle in accordance with claim 7, wherein a part of said U-shaped spring portion which is to engage with said lower projection is extended close to the disc rotor side-edge of said circumferential positioning portion for making said U-shaped spring portion engage with said lower projection at where said first brake pad is being exactly positioned by said circumferential positioning portion.

9. A disc brake for a vehicle in accordance with claim 8, wherein a second anti-rattling member is disposed between said first brake pad and said second torque receiving arm, and each of said anti-rattling members is provided with an anti-rusting portion, which is interposed between said first brake pad and each of said torque receiving arms for preventing them from being rusted therebetween.

10. A disc brake for a vehicle in accordance with claim 4, wherein said fixed member comprises a first member provided with said first and second torque receiving arms and a second member secured to the tip of said first and second torque receiving arms with rivets having rivet heads, and said anti-rattling member is provided with an engaging hole, at a contacting portion with said first torque receiving arm for being secured to said first torque receiving arm by inserting one of said rivet heads into said engaging hole.

* * * * *